(12) United States Patent
Kato

(10) Patent No.: US 9,751,523 B2
(45) Date of Patent: Sep. 5, 2017

(54) HYBRID VEHICLE

(71) Applicant: Toyota Jidosha Kabushiki Kaisha, Toyota-shi, Aichi-ken (JP)

(72) Inventor: Hajime Kato, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/252,581

(22) Filed: Aug. 31, 2016

(65) Prior Publication Data

US 2017/0066434 A1 Mar. 9, 2017

(30) Foreign Application Priority Data

Sep. 3, 2015 (JP) ................... 2015-173848

(51) Int. Cl.
| | |
|---|---|
| *B60W 20/00* | (2016.01) |
| *B60W 10/26* | (2006.01) |
| *B60W 10/08* | (2006.01) |
| *B60W 20/14* | (2016.01) |
| *B60W 10/06* | (2006.01) |
| *B60K 6/445* | (2007.10) |
| *B60W 30/14* | (2006.01) |
| *B60W 30/18* | (2012.01) |

(52) U.S. Cl.
CPC ............ *B60W 20/14* (2016.01); *B60K 6/445* (2013.01); *B60W 10/06* (2013.01); *B60W 10/08* (2013.01); *B60W 10/26* (2013.01); *B60W 30/143* (2013.01); *B60W 30/146* (2013.01); *B60W 30/18127* (2013.01); *B60W 2510/244* (2013.01); *B60W 2510/246* (2013.01); *B60W 2710/0644* (2013.01); *B60W 2710/248* (2013.01); *B60Y 2200/92* (2013.01); *Y10S 903/93* (2013.01); *Y10S 903/951* (2013.01)

(58) Field of Classification Search
CPC ...... B60W 10/08; B60W 10/26; B60W 20/14; B60W 2510/244; B60W 2510/246; B60W 2710/0644; B60W 2710/18; B60Y 2200/92; B60Y 2300/188; Y10S 903/93
See application file for complete search history.

(56) References Cited

U.S. PATENT DOCUMENTS

| | | | |
|---|---|---|---|
| 2012/0049806 A1* | 3/2012 | Saito ...................... | B60K 6/485 322/23 |
| 2014/0180517 A1* | 6/2014 | Endo ................. | B60W 20/1062 701/22 |

FOREIGN PATENT DOCUMENTS

JP 2014-125078 A 7/2014

* cited by examiner

*Primary Examiner* — Jerrah Edwards
*Assistant Examiner* — Charles J Han
(74) *Attorney, Agent, or Firm* — Dinsmore & Shohl LLP

(57) ABSTRACT

A hybrid vehicle includes a control unit that performs control such that the motoring of an engine is carried out at a higher rotational speed when a required braking force is large than when the required braking force is small, from the start of charge of a battery to the start of rapid decrease in a charging power of the battery, in the case where predetermined control is performed to control a first motor and a second motor such that the battery is charged within a range of a permissible charging power through regenerative driving of the second motor and the motoring of the engine by the first motor with fuel injection stopped and that the required braking force at a braking request is applied to the vehicle, in response to the making of the braking request during the performance of cruise control or variable speed limiter control.

6 Claims, 8 Drawing Sheets

HYBRID VEHICLE

CROSS-REFERENCE TO RELATED APPLICATIONS

This application claims priority to Japanese Patent Application No. 2015-173848 filed on Sep. 3, 2015, the entire contents of which are hereby incorporated by reference.

BACKGROUND

1. Field

The disclosure relates to a hybrid vehicle.

2. Description of Related Art

A hybrid vehicle that has been proposed (e.g., see Japanese Patent Application Publication No. 2014-125078 (JP 2014-125078 A)) is configured to be equipped with an engine, a first motor, a planetary gear, a second motor and a battery. The planetary gear has a sun gear, a carrier and a ring gear, which are connected to the first motor, the engine and a drive shaft coupled to an axle respectively. The second motor is connected to the drive shaft. The battery exchanges power with the first motor and the second motor. In this configuration, when an accelerator is off, a braking force is applied to the vehicle through regenerative driving of the second motor and the motoring of the engine by the first motor with fuel injection stopped. With this hybrid vehicle, when the accelerator is off, the motoring of the engine is carried out by the first motor so that power is consumed by the first motor. Thus, the battery is restrained from being overcharged.

SUMMARY

In general, when the charge of the battery with a relatively large charging power (a relatively large charging current) is continued, an accelerated deterioration in the battery is likely to be caused. Therefore, with a view to restraining an accelerated deterioration in the battery from being caused, the permissible charging power of the battery is set such that the time from the start of the charge of the battery to the start of rapid decrease in charging power becomes shorter and the amount of decrease per unit time (the rate of decrease) at the time of the start of rapid decrease in charging power becomes larger when the charging power of the battery is large than when the charging power of the battery is small, in the case where the charge is continued. If the motoring of the engine is carried out at a uniform rotational speed regardless of a required braking force at a braking request when the braking request is made during the performance of cruise control or variable speed limiter control, the charging power is relatively large, the time to the start of rapid decrease in charging power is relatively short, and the rate of decrease at the time of the start of rapid decrease in charging power is relatively large when the required braking power is relatively large. In starting to rapidly decrease the charging power, it is necessary to start to rapidly raise the rotational speed of the engine and start to rapidly increase the power consumed by the first motor. When the amount of rise in the rotational speed of the engine per unit time is relatively large, a driver may develop a feeling of strangeness.

The disclosure provides a hybrid vehicle that can restrain a driver from developing a feeling of strangeness during the performance of cruise control or variable speed limiter control.

A hybrid vehicle according to an aspect of the disclosure includes an engine, a first motor, a planetary gear, a second motor, a battery, a setting unit and a control unit. The planetary gear has three rotary elements that are connected to a rotary shaft of the first motor, an output shaft of the engine and a drive shaft coupled to an axle respectively in such a manner as to be arranged in a sequence of the rotary shaft, the output shaft and the driver shaft in an alignment chart. The second motor is connected to the drive shaft. The battery exchanges power with the first motor and the second motor. The setting unit is configured to set a permissible charging power of the battery and a permissible discharging power of the battery. The control unit is configured to control the engine, the first motor and the second motor such that the vehicle runs while the battery is charged/discharged within a range of the permissible charging power and a range of the permissible discharging power respectively. The setting unit is configured to set the permissible charging power such that a time from start of charge of the battery to start of rapid decrease in a charging power of the battery becomes shorter and an amount of decrease per unit time at a time of start of rapid decrease in the charging power becomes larger when the charging power is large than when the charging power is small, in a case where the charge is continued. The control unit is configured to perform control such that motoring of the engine is carried out at a higher rotational speed when a required braking force is large than when the required braking force is small, from start of the charge to start of rapid decrease in the charging power, in a case where predetermined control is performed to control the first motor and the second motor such that the battery is charged within the range of the permissible charging power through regenerative driving of the second motor and motoring of the engine by the first motor with fuel injection stopped and that the required braking force at a braking request is applied to the vehicle, in response to making of the braking request during performance of cruise control or variable speed limiter control.

In the aforementioned aspect of the disclosure, the engine, the first motor and the second motor are controlled such that the vehicle runs while the battery is charged/discharged within the ranges of the permissible charging power and the permissible discharging power respectively. Then, the permissible charging power is set such that the time from the start of the charge of the battery to the start of rapid decrease in the charging power of the battery becomes shorter and the amount of decrease per unit time at the time of the start of rapid decrease in the charging power becomes larger when the charging power is large than when the charging power is small, in the case where the charge is continued. It should be noted herein that "rapid decrease" means that the amount of decrease per unit time is larger than a predetermined amount of decrease. Then, control is performed such that the motoring of the engine is carried out at a higher rotational speed when the required braking force is large than when the required braking force is small, from the start of the charge of the battery to the start of rapid decrease in the charging power, in the case where predetermined control is performed to control the first motor and the second motor such that the battery is charged within the range of the permissible charging power through regenerative driving of the second motor and the motoring of the engine by the first motor with fuel injection stopped and that the required braking force at the braking request is applied to the vehicle, in response to the making of the braking request during the performance of cruise control or variable speed limiter control. Thus, when the required braking force is relatively large, the power consumed by the first motor is made larger and the charging power of the battery is made smaller than in the case where control is performed such that the motoring of the engine is performed at a uniform rotational speed regardless of the required braking force, from the start of the charge to the start of rapid decrease in the charging power. Accordingly, the time to the start of rapid decrease in the charging power of the battery can be restrained from becoming short, and the time to the start of rapid increase in the rotational speed of the engine can be restrained from becoming short. Besides, the amount of decrease per unit time at the time of the start of rapid decrease in the charging power of the battery can also be restrained from becoming large, and the amount of rise per unit time at the time of the start of rapid rise in the rotational speed of the engine can also be restrained from becoming large. As a result, the driver can be restrained from developing a feeling of strangeness when the braking request continues during the performance of cruise control or variable speed limiter control.

In the aforementioned aspect of the disclosure, the control unit may be configured not to carry out motoring of the engine by the first motor when the required braking force is equal to or smaller than a threshold from start of the charge to start of rapid decrease in the charging power, in performing the predetermined control. Thus, the first motor can be restrained from consuming power.

In the aforementioned aspect of the disclosure, the setting unit may be configured to set the permissible charging power such that the time from start of the charge to start of rapid decrease in the charging power becomes shorter when a temperature of the battery is low than when the temperature of the battery is high, in the case where the charge is continued. The control unit may be configured to perform control such that motoring of the engine is carried out at a rotational speed that is higher when the required braking force is large than when the required braking force is small and that is higher when the temperature of the battery is low than when the temperature of the battery is high, until start of rapid decrease in the charging power, in performing the predetermined control in response to the making of the braking request during performance of the cruise control or the variable speed limiter control. Thus, the driver can be more appropriately restrained from developing a feeling of strangeness in accordance with the temperature of the battery, when the braking request continues during the performance of cruise control or variable speed limiter control.

In the aforementioned configuration, the control unit may be configured to set a required charging power of the battery such that the required charging power becomes smaller when the temperature of the battery is low than when the temperature of the battery is high, until start of rapid decrease in the charging power, in performing the predetermined control in response to the making of the braking request during performance of the cruise control or the variable speed limiter control, limit the required charging power by the permissible charging power and set a target charging power of the battery, set a target rotational speed of the engine such that the target rotational speed becomes higher when the required braking force is large than when the required braking force is small and higher when the target charging power is small than when the target charging power is large, and perform control such that motoring of the engine is carried out at the target rotational speed. Thus, the driver can be restrained from developing a feeling of strangeness when the braking request continues during the performance of cruise control or variable speed limiter control, by setting the required charging power in accordance with the temperature of the battery, setting the target charging power in accordance therewith, and setting the target rotational speed in accordance with the required braking force and the target charging power.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION

Next, embodiments of the present disclosure will be described.

Figure 1:
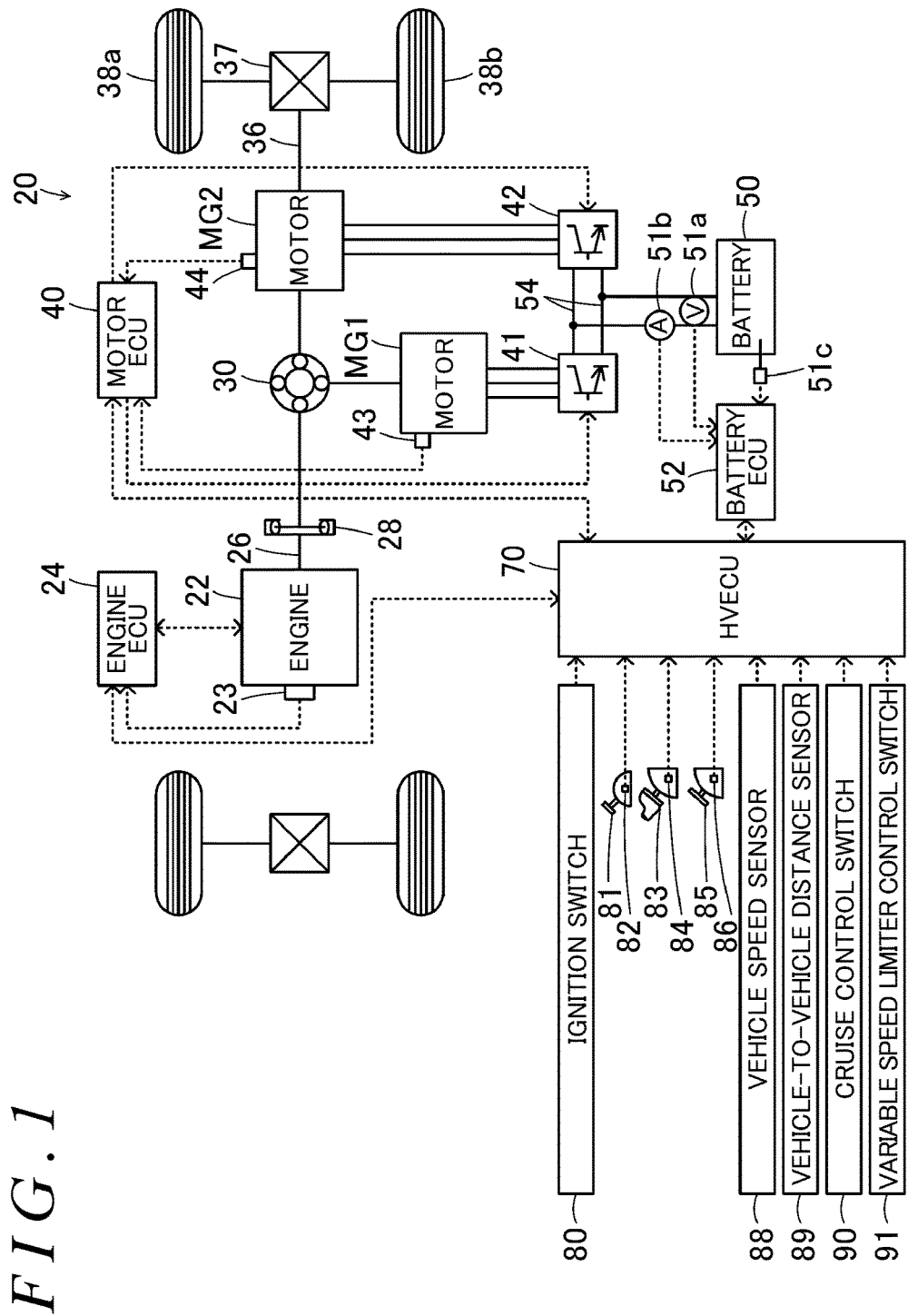
FIG. 1 is a schematic view showing the outline of the configuration of a hybrid vehicle 20.

FIG. 1 is a schematic view showing the outline of the configuration of a hybrid vehicle 20. As shown in the drawing, the hybrid vehicle 20 is equipped with the engine 22, a planetary gear 30, motors MG1 and MG2, inverters 41 and 42, the battery 50 and a hybrid electronic control unit (hereinafter referred to as "an HVECU") 70.

The engine 22 is configured as an internal combustion engine that outputs a dynamic force using gasoline, light oil or the like as fuel. The operation of this engine 22 is controlled by an engine electronic control unit (hereinafter referred to as "an engine ECU") 24.

Although not shown in the drawing, the engine ECU 24 is configured as a microprocessor that is mainly constituted of a CPU, and is equipped with a ROM that stores processing programs, a RAM that temporarily stores data, input/output ports and a communication port in addition to the CPU. Signals from various sensors needed to control the operation of the engine 22 are input to the engine ECU 24 from the input ports thereof. As the signals input to the engine ECU 24, it is possible to mention a crank angle θcr from a crank position sensor 23 that detects a rotational position of a crankshaft 26 of the engine 22, and a throttle opening degree TH from a throttle valve position sensor that detects a position of a throttle valve.

Various control signals for controlling the operation of the engine 22 are output from the engine ECU 24 via the output ports thereof. As the control signals output from the engine ECU 24, it is possible to mention a control signal to a throttle motor that adjusts the position of the throttle valve, a control signal to fuel injection valves, and a control signal to ignition coils that are integrated with igniters.

The engine ECU 24 is connected, via the communication port thereof, to the HVECU 70, controls the operation of the engine 22 in accordance with a control signal from the HVECU 70, and outputs data on an operating state of the engine 22 to the HVECU 70 as needed. The engine ECU 24 computes a rotational speed of the crankshaft 26, namely, the rotational speed Ne of the engine 22 based on the crank angle θcr from the crank position sensor 23.

The planetary gear 30 is configured as a single pinion-type planetary gear mechanism. A rotor of the motor MG1 is connected to a sun gear of the planetary gear 30. A drive shaft 36 that is coupled to driving wheels 38a and 38b via a differential gear 37 is connected to a ring gear of the planetary gear 30. The crankshaft 26 of the engine 22 is connected to a carrier of the planetary gear 30 via a damper 28.

The motor MG1 is configured as, for example, a synchronous generator motor. As described above, the rotor of the motor MG1 is connected to the sun gear of the planetary gear 30. The motor MG2 is configured as, for example, a synchronous generator motor, and has a rotor connected to the drive shaft 36. Inverters 41 and 42 are connected to the battery 50 via a power line 54. The motors MG 1 and MG2 are rotationally driven through the performance of switching control of a plurality of switching elements (not shown) of the inverters 41 and 42 by a motor electronic control unit (hereinafter referred to as "a motor ECU") 40.

Although not shown in the drawing, the motor ECU 40 is configured as a microprocessor that is mainly constituted of a CPU, and is equipped with a ROM that stores processing programs, a RAM that temporarily stores data, input/output ports and a communication port in addition to the CPU. Signals from various sensors needed to control the driving of the motors MG1 and MG2 are input to the motor ECU 40 via the input ports thereof. As the signals input to the motor ECU 40, it is possible to mention rotational positions θm1 and θm2 from rotational position detection sensors 43 and 44 that detect rotational positions of the rotors of the motors MG1 and MG2, and phase currents from current sensors that detect currents flowing through respective phases of the motors MG1 and MG2.

Switching control signals to a plurality of switching elements (not shown) of the inverters 41 and 42, and the like are output from the motor ECU 40 via the output ports thereof. The motor ECU 40 is connected, via the communication port thereof, to the HVECU 70, controls the driving of the motors MG1 and MG2 in accordance with a control signal from the HVECU 70, and outputs data on driving states of the motors MG1 and MG2 to the HVECU 70 as needed. The motor ECU 40 computes rotational speeds Nm1 and Nm2 of the motors MG1 and MG2 based on the rotational positions θm1 and θm2 of the rotors of the motors MG1 and MG2 from the rotational position detection sensors 43 and 44, respectively.

The battery 50 is configured as a lithium-ion secondary battery. As described above, this battery 50 is connected to the inverters 41 and 42 via the power line 54. The battery 50 is managed by a battery electronic control unit (hereinafter referred to as "a battery ECU) 52.

Although not shown in the drawing, the battery ECU 52 is configured as a microprocessor that is mainly constituted of a CPU, and is equipped with a ROM that stores processing programs, a RAM that temporarily stores data, input/output ports and a communication port in addition to the CPU. Signals from various sensors needed to manage the battery 50 are input to the battery ECU 52 via the input ports thereof. As the signals input to the battery ECU 52, it is possible to mention a battery voltage Vb from a voltage sensor 51a that is installed between terminals of the battery 50, a battery current Ib (which assumes a positive value when the battery 50 is discharged) from a current sensor 51b that is attached to an output terminal of the battery 50, and the battery temperature Tb from a temperature sensor 51c that is attached to the battery 50.

The battery ECU 52 is connected, via the communication port thereof, to the HVECU 70, and outputs data on the state of the battery 50 to the HVECU 70 as needed. The battery ECU 52 computes an electrical storage ratio SOC based on an integrated value of the battery current Ib from the current sensor Sib. The electrical storage ratio SOC is the ratio of a capacity of a power dischargeable from the battery 50 to a total capacity of the battery 50. Besides, the battery ECU 52 computes the input limit Win of the battery 50 and an output limit Wout of the battery 50. The input limit Win is a permissible charging power with which the battery 50 may be charged, and the output limit Wout is a permissible discharging power which may be discharged from the battery 50.

Although not shown in the drawing, the HVECU 70 is configured as a microprocessor that is mainly constituted of a CPU, and is equipped with a ROM that stores processing programs, a RAM that temporarily stores data, input/output ports and a communication port in addition to the CPU. Signals from various sensors are input to the HVECU 70 via the input ports thereof. As the signals input to the HVECU 70, it is possible to mention an ignition signal from an ignition switch 80, a shift position SP from a shift position sensor 82 that detects an operation position of a shift lever 81, an accelerator opening degree Acc from an accelerator pedal position sensor 84 that detects a depression amount of an accelerator pedal 83, a brake pedal position BP from a brake pedal position sensor 86 that detects a depression amount of a brake pedal 85, a vehicle speed V from a vehicle speed sensor 88, a vehicle-to-vehicle distance D to a preceding vehicle from a vehicle-to-vehicle distance sensor 89, a switch signal from a cruise control switch 90 that issues a command to perform cruise control (constant-speed control for causing the vehicle to run while automatically holding the vehicle speed substantially constant, or vehicle-to-vehicle control for causing the vehicle to run (to run while following the preceding vehicle) while automatically holding the vehicle-to-vehicle distance to the preceding vehicle substantially constant), and a switch signal from a variable speed limiter control switch 91 that issues a command to perform variable speed limiter control.

The cruise control switch 90 is configured to allow a driver to set a target vehicle speed V*, a target vehicle-to-vehicle distance D* and the like when the cruise control switch 90 is on, as well as to turn on and off the cruise control switch 90. Besides, the variable speed limiter control switch 91 is configured to allow the driver to set an upper-limit vehicle speed Vlim and the like when the variable speed limiter control switch 91 is on, as well as to turn on and off the variable speed limiter control switch 91.

As described above, the HVECU 70 is connected, via the communication port thereof, to the engine ECU 24, the motor ECU 40 and the battery ECU 52, and exchanges various control signals with the engine ECU 24, the motor ECU 40 and the battery ECU 52.

Incidentally, in some embodiments, a parking position (a P position) that is used in parking the vehicle, a reverse position (an R position) for running backward, a neutral position (an N position), a drive position (a D position) for running forward, a brake position (a B position) for applying a braking force that is larger than at the D position to the vehicle when an accelerator is off, and the like are available as an operation position of the shift lever 81 (the shift position SP detected by the shift position sensor 82).

With the hybrid vehicle 20 thus configured, when neither cruise control nor variable speed limiter control is performed, a required torque Tr* that is required for running (that is required of the drive shaft 36) is set based on the shift position SP, the accelerator opening degree Acc and the vehicle speed V. Then, the engine 22 is operated or stopped from being operated, and the engine 22 and the motors MG1 and MG2 are controlled such that a charging/discharging power Pb (=Vb·Ib) of the battery 50 falls within a range of the input limit Win and the output limit Wout, and that a torque based on the required torque Tr* is output to the drive shaft 36.

Besides, in some embodiments, when the cruise control switch 90 is turned on, constant-speed control or vehicle-to-vehicle control is performed as cruise control. It is determined which one of constant-speed control and vehicle-to-vehicle control should be selected to be performed, depending on, for example, whether or not there is a preceding vehicle, etc. In constant-speed control, the required torque Tr* is set such that the vehicle speed V becomes equal to a target vehicle speed Vcc*, the engine 22 is operated or stopped from being operated, and the engine 22 and the motors MG1 and MG2 are controlled such that the charging/discharging power Pb of the battery 50 falls within the range of the input limit Win and the output limit Wout and that a torque based on the required torque Tr* is output to the drive shaft 36. In vehicle-to-vehicle control, the required torque Tr* is set such that the vehicle-to-vehicle distance D to the preceding vehicle becomes equal to the target vehicle-to-vehicle distance D*, the engine 22 is operated or stopped from being operated, and the engine 22 and the motors MG1 and MG2 are controlled such that the charging/discharging power Pb of the battery 50 falls within the range of the input limit Win and the output limit Wout and that a torque based on the required torque Tr* is output to the drive shaft 36. In some embodiments, this cruise control is canceled when the cruise control switch 90 is turned off, when the brake pedal 85 is depressed, when the variable speed limiter control switch 91 is turned on, etc.

Furthermore, in some embodiments, when the variable speed limiter control switch 91 is turned on, variable speed limiter control is performed. In variable speed limiter control, the required torque Tr* is set, based on the accelerator opening degree Acc and the vehicle speed V, such that the vehicle speed V does not exceed an upper-limit vehicle speed Vlim, the engine 22 is operated or stopped from being operated, and the engine 22 and the motors MG1 and MG2 are controlled such that the charging/discharging power Pb of the battery 50 falls within the range of the input limit Win and the output limit Wout and that a torque based on the required torque Tr* is output to the drive shaft 36. This variable speed limiter control is canceled when the variable speed limiter control switch 91 is turned off, when the cruise control switch 90 is turned on, etc.

Figure 2:
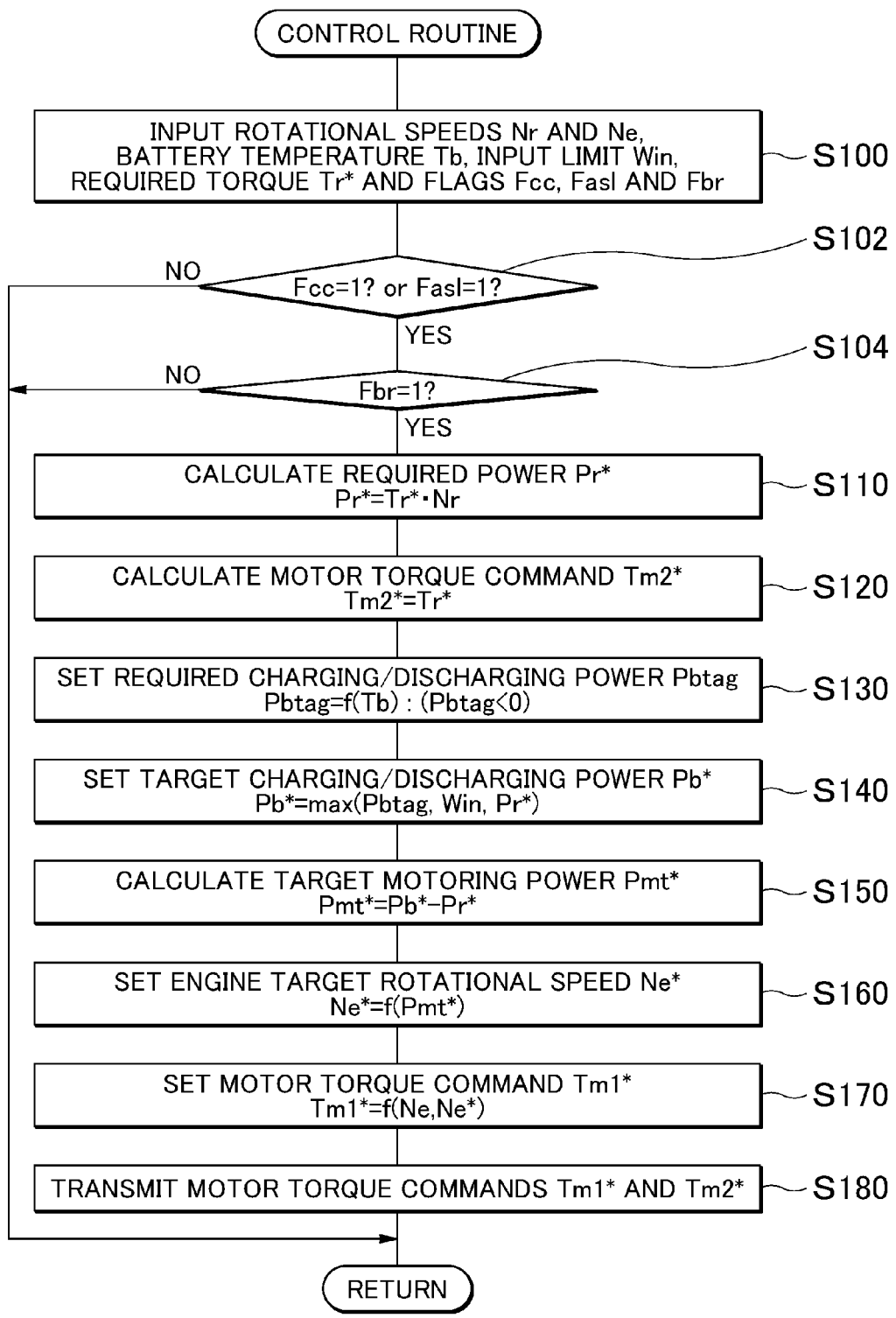
FIG. 2 is a flowchart showing an exemplary control routine that is repeatedly executed by an HVECU 70.

Next, the operation of the hybrid vehicle 20 according to some embodiments thus configured, especially the operation of the hybrid vehicle 20 at a time when a braking request is made (when the required torque Tr* assumes a negative value) during the performance of cruise control or variable speed limiter control will be described. FIG. 2 is a flowchart showing an exemplary control routine that is repeatedly executed by the HVECU 70.

When the control routine of FIG. 2 is executed, the HVECU 70 first causes data on a rotational speed Nr of the drive shaft 36, the rotational speed Ne of the engine 22, the battery temperature Tb, the input limit Win of the battery 50, the required torque Tr*, flags Fcc, Fasl and Fbr and the like to be input thereto (step S100). It should be noted herein that the rotational speed Nr of the drive shaft 36 is input to the HVECU 70 through communication, regarding the rotational speed Nm2 of the motor MG2 computed by the motor ECU 40 as the rotational speed Nr. As the rotational speed Ne of the engine 22, a value computed by the engine ECU 24 is input to the HVECU 70 through communication. As the battery temperature Tb, a value detected by the temperature sensor 51c is input to the HVECU 70 from the battery ECU 52 through communication. As the input limit Win of the battery 50, a value computed by the battery ECU 52 is input to the HVECU 70 through communication. As the required torque Tr*, a value set as described above is input to the HVECU 70. As the flags Fcc, Fasl and Fbr, values set by a flag setting routine (not shown) that is executed by the HVECU 70 are input to the HVECU 70. In the flag setting routine, the HVECU 70 sets values 0 and 1 as the flag Fcc when cruise control is not performed and when cruise control is performed, respectively. The HVECU 70 sets the values 0 and 1 as the flag Fasl when variable speed limiter control is not performed and when variable speed limiter control is performed, respectively. The HVECU 70 sets the values 0 and 1 as the flag Fbr when no braking request is made and when a braking request is made, respectively.

The input limit Win of the battery 50 will now be described. The battery ECU 52 sets the input limit Win of the battery 50 within a range equal to or smaller than the value 0, based on the battery temperature Tb, the electrical storage ratio SOC and the charging/discharging power Pb (=Vb·Ib) at the time when the charge of the battery 50 is continued.

First of all, a relationship between the battery temperature Tb and the electrical storage ratio SOC on the one hand and the input limit Win on the other hand will be described. In this relationship, the input limit Win is so set as to become larger (smaller as a value on the charge side) when the battery temperature Tb is low than when the battery temperature Tb is high, and to become larger (smaller as a value on the charge side) when the electrical storage ratio SOC is large than when the electrical storage ratio SOC is small. In concrete terms, the input limit Win is so set as to increase as the battery temperature Tb falls and to increase as the electrical storage ratio SOC increases. This results from the temperature characteristics of the battery 50 and the electrical storage ratio characteristics.

Figure 3:
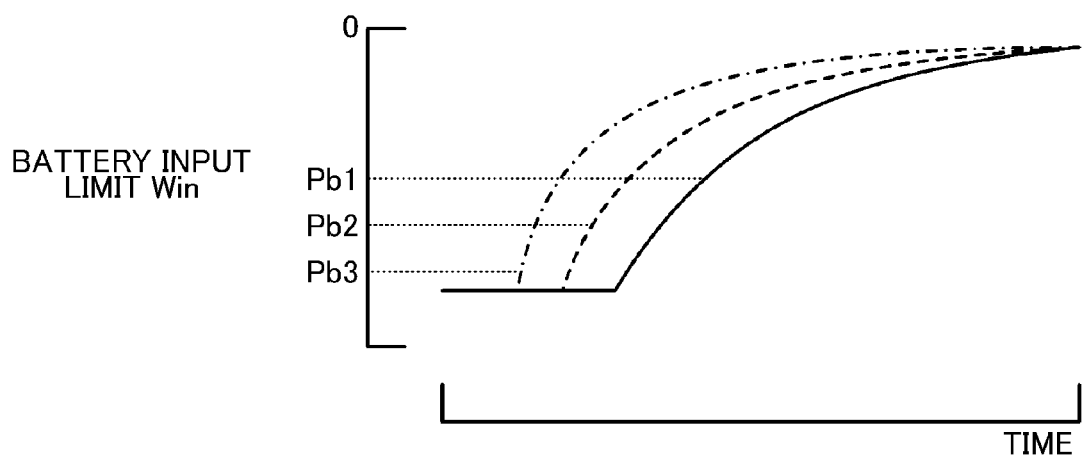
FIG. 3 is an illustrative view showing an exemplary relationship between a charging/discharging power Pb (a charging/discharging current Ib) and an input limit Win when the charge of a battery 50 is continued.

Subsequently, a relationship between the charging/discharging power Pb and the input limit Win at the time when the charge of the battery 50 is continued will be described. FIG. 3 is an illustrative view showing an example of this relationship. In the drawing, a solid line, a broken line and an alternate long and short dash line indicate the input limit Win when the charging/discharging power Pb at the time of the start of the charge of the battery 50 is equal to a power Pb1, a power Pb2 and a power Pb3 (Pb3<Pb2<Pb1<0) respectively, with the battery temperature Tb equal to a uniform temperature. Incidentally, in this drawing, the power obtained by limiting each of the powers Pb1, Pb2 and Pb3 by the input limit Win (by guarding each of the powers Pb1, Pb2 and Pb3 by a lower limit) is equivalent to the charging/discharging power Pb. In this relationship, as shown in FIG. 3, the input limit Win is set such that a time from the start of the charge of the battery 50 to the start of rapid increase in the charging/discharging power Pb (rapid decrease as a value on the charge side) becomes shorter and an amount of increase (an amount of decrease as a value on the charge side) per unit time at the time of the start of rapid increase in the charging/discharging power Pb becomes larger when the charging/discharging power Pb is small (large as a value on the charge side) than when the charging/discharging power Pb is large. This is because of the purpose of restraining an accelerated deterioration in the battery 50 from being caused by suppressing the precipitation of lithium in the battery 50 and the like in accordance with a history (an integrated value of the charging/discharging power Pb (the charging/discharging current Ib)) when the charge of the battery 50 is continued. Incidentally, "rapid increase (rapid decrease)" means that the amount of increase (the amount of decrease) per unit time is larger than a predetermined amount of increase (a predetermined amount of decrease).

Figure 4:
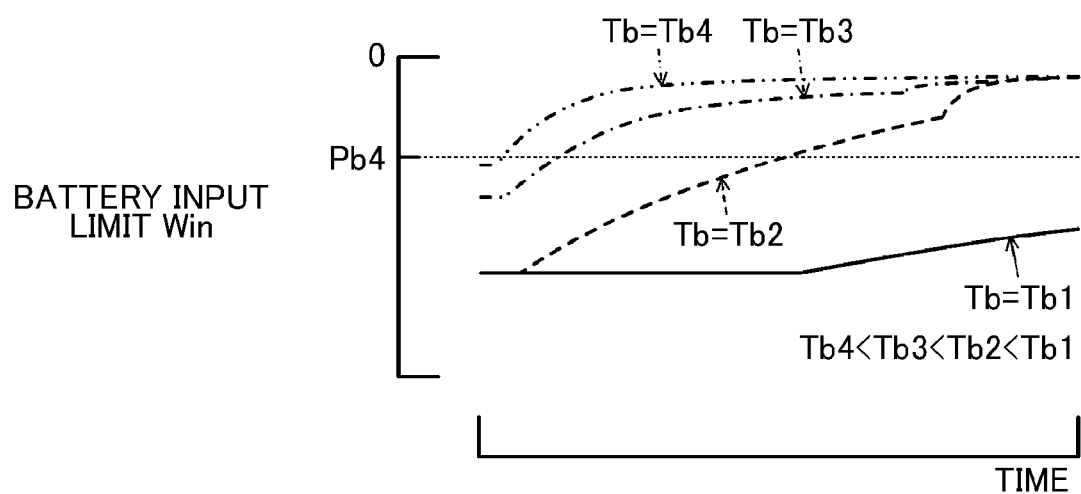
FIG. 4 is an illustrative view showing an exemplary relationship between a battery temperature Tb and the input limit Win when the charge of the battery 50 is continued.

Furthermore, a relationship between the battery temperature Tb and the input limit Win at the time when the charge of the battery 50 is continued will be described. FIG. 4 is an illustrative view showing an example of this relationship. In the drawing, a solid line, a broken line, an alternate long and short dash line and an alternate long and two short dashes line indicate the input limit Win when the battery temperature Tb is equal to a temperature Tb1, a temperature Tb2, a temperature Tb3 and a temperature Tb4 (Tb1>Tb2 >Tb3>Tb4) respectively with the charging/discharging power Pb at the time of the start of the charge of the battery 50 equal to a uniform power Pb4 (Pb4<0). Incidentally, in this drawing as well as FIG. 3, the power obtained by limiting the power Pb4 by the input limit Win (by guarding the power Pb4 by a lower limit) is equivalent to the charging/discharging power Pb. In this relationship, the input limit Win is set such that a time from the start of the charge of the battery 50 to the start of rapid increase (rapid decrease as a value on the charge side) in the charging/discharging power Pb becomes shorter when the battery temperature Tb is low than when the battery temperature Tb is high. This is because of the purpose of restraining an accelerated deterioration in the battery 50 from being caused by suppressing the precipitation of lithium in the battery 50 and the like in accordance with the battery temperature Tb when the charge of the battery 50 is continued.

When the data are thus input, the values of the flags Fcc and Fasl are checked (step S102), and the value of the flag Fbr is checked (step S104). If both the flags Fcc and Fasl are equal to the value 0 in step S102, it is determined that neither cruise control nor variable speed limiter control is performed, and the present routine is ended. If the flag Fcc or the flag Fasl is equal to the value 1 in step S102 and if the flag Fbr is equal to the value 0 in step S104, it is determined that no braking request is made when cruise control or variable speed limiter control is performed, and the present routine is ended.

If the flag Fcc or the flag Fasl is equal to the value 1 in step S102 and if the flag Fbr is equal to the value 1 in step S104, it is determined that a braking request is made when cruise control or variable speed limiter control is performed, a required power Pr* required of the vehicle is calculated by multiplying the required torque Tr* by the rotational speed Nr of the drive shaft 36 (step S110), and the required torque Tr* is set as a torque command Tm2* of the motor MG2 (step S120). When the vehicle runs forward (when the rotational speed Nr of the drive shaft 36 is positive), the required power Pr* as well as the required torque Tr* assumes a negative value.

Figure 5:
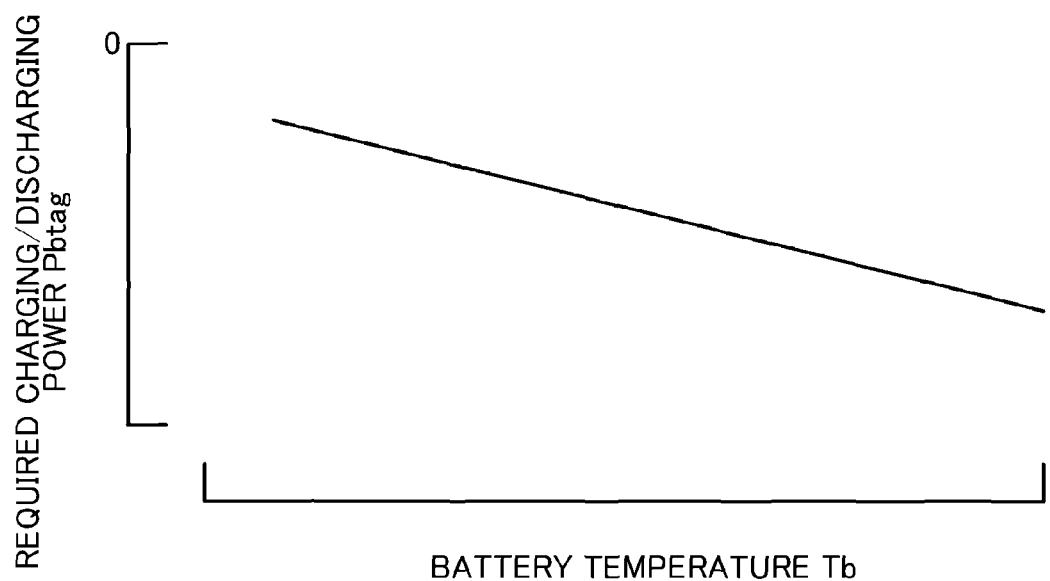
FIG. 5 is an illustrative view showing an exemplary required charging/discharging power setting map.

Then, a required charging/discharging power Pbtag is set within a range smaller than the value 0 (a range where the battery 50 is charged) based on the battery temperature Tb (step S130), and a target charging/discharging power Pb* of the battery 50 is set by limiting the set required charging/discharging power Pbtag by the input limit Win and the required power Pr* (by guarding the set required charging/discharging power Pbtag by lower limits) (step S140). It should be noted herein that the required charging/discharging power Pbtag is set by determining the relationship between the battery temperature Tb and the required charging/discharging power Pbtag in advance, storing the determined relationship into the ROM (not shown) as a required charging/discharging power setting map, and deriving the corresponding required charging/discharging power Pbtag from this map when the battery temperature Tb and the vehicle speed V are given, in some embodiments. FIG. 5 shows an example of the required charging/discharging power setting map. As shown in the drawing, the required charging/discharging power Pbtag is so set as to become larger (smaller as a value on the charge side) when the battery temperature Tb is low than when the battery temperature Tb is high, in concrete terms, to increase as the battery temperature Tb falls. The reason why the required charging/discharging power Pbtag is thus set will be described later.

Figure 6:
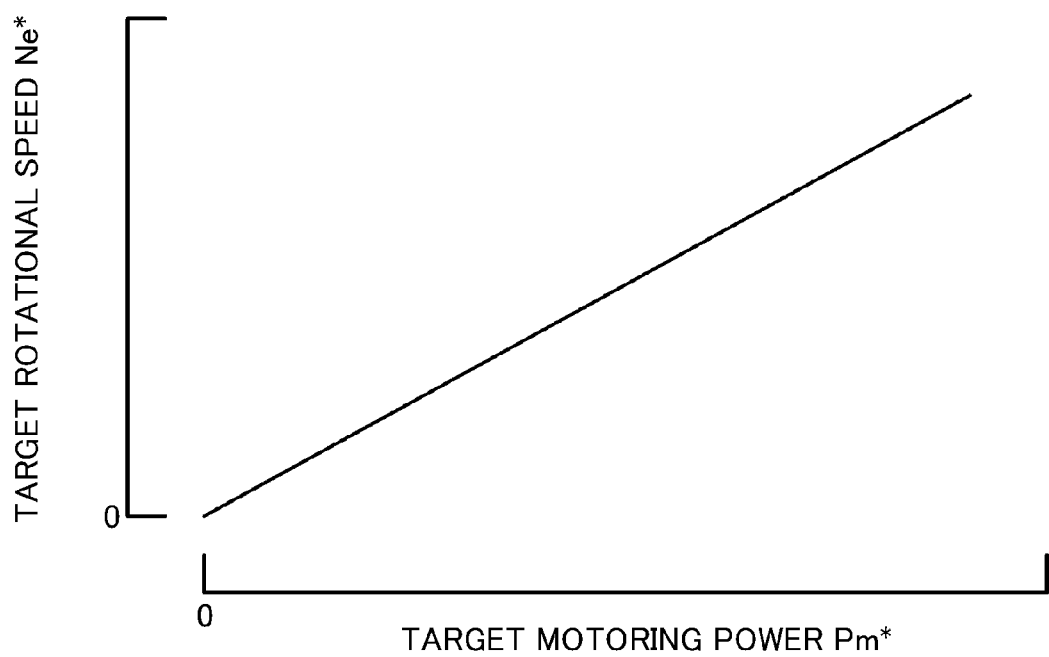
FIG. 6 is an illustrative view showing an exemplary target rotational speed setting map.

When the target charging/discharging power Pb* of the battery 50 is thus set, a value obtained by subtracting the required power Pr* from the set target charging/discharging power Pb* is set as a target motoring power Pmt* (step S150), and a target rotational speed Ne* of the engine 22 is set based on the set target motoring power Pmt* (step S160). It should be noted herein that the target motoring power Pmt* is a target value of a consumed power (an electric power consumption) at the time of the motoring of the engine 22 by the motor MG1 with fuel injection stopped. Besides, in some embodiments, the target rotational speed Ne* of the engine 22 is set by determining a relationship between the target motoring power Pmt* and the target rotational speed Ne* of the engine 22 in advance, storing the determined relationship into the ROM (not shown) as a target rotational speed setting map, and deriving the corresponding target rotational speed Ne* from this map when the target motoring power Pmt* is given. FIG. 6 shows an example of the target rotational speed setting map. The target rotational speed Ne* of the engine 22 is so set as to become higher when the target motoring power Pmt* is large than when the target motoring power Pmt* is small, in concrete terms, to rise as the target motoring power Pmt* increases. This is because the friction of the engine 22 is larger and the power consumed by the motor MG 1 is larger when the rotational speed Ne of the engine 22 is high than when the rotational speed Ne of the engine 22 is low.

Now, a case where the required charging/discharging power Pbtag is set as the target charging/discharging power Pb* will be considered. It should be noted herein that the required charging/discharging power Pbtag is set as the target charging/discharging power Pb* basically from the start of the charge of the battery 50 to the start of rapid increase (rapid decrease as a value on the charge side) in the charging/discharging power Pb of the battery 50. In some embodiments, as described above, the required charging/discharging power Pbtag is so set as to become larger (becomes smaller as a value on the charge side) when the battery temperature Tb is low than when the battery temperature Tb is high. Accordingly, the target motoring power Pmt* is larger and the target rotational speed Ne* of the engine 22 is higher when the battery temperature Tb is low than when the battery temperature Tb is high. Besides, in some embodiments, the required charging/discharging power Pbtag is set without taking the required torque Tr* (the required power Pr*) into account. Accordingly, the target motoring power Pmt* is larger and the target rotational speed Ne* of the engine 22 is higher when the required torque Tr* is small (large as a value on the braking side) than when the required torque Tr* is large.

Besides, a case where the input limit Win of the battery 50 is set as the target charging/discharging power Pb* will be considered. It should be noted herein that the input limit Win is set as the target charging/discharging power Pb* basically at and after the start of rapid increase (rapid decrease as a value on the charge side) in the charging/discharging power Pb of the battery 50. At this time, the target motoring power Pmt* and the target rotational speed Ne* of the engine 22 are set in accordance with the input limit Win. Accordingly, the target rotational speed Ne* of the engine 22 rises as the input limit Win increases (decreases as a value on the charge side).

When the target rotational speed Ne* of the engine 22 is thus set, a torque command Tm1* of the motor MG1 is set according to an equation (1) shown below, using the rotational speed Ne of the engine 22 and the target rotational speed Ne* (step S170). It should be noted herein that the equation (1) is a relational expression in rotational speed feedback control for rotating the engine 22 at the target rotational speed Ne*, that "k1" in the first term of the right side in the equation (1) is a gain of a proportional term, and that "k2" in the second term of the right side in the equation (1) is a gain of an integral term.

$$Tm1^* = k1 \cdot (Ne^* - Ne) + k2 \cdot \int (Ne^* - Ne) dt \qquad (1)$$

Then, when the torque commands Tm1* and Tm2* of the motors MG1 and MG2 are set, the set torque commands Tm1* and Tm2* are transmitted to the motor ECU 40 (step S180), and the present routine is ended. Upon receiving the torque commands Tm1* and Tm2* of the motors MG1 and MG2, the motor ECU 40 performs switching control of the switching elements of the inverters 41 and 42 such that the motors MG1 and MG2 are driven at the torque commands Tm1* and Tm2* respectively.

By performing this control, a braking force can be applied to the vehicle while charging the battery 50 within the range of the input limit Win of the battery 50 through regenerative driving of the motor MG2 and the motoring of the engine 22 by the motor MG1 with fuel injection stopped, when a braking request is made during the performance of cruise control or variable speed limiter control. Incidentally, at this time, the torque applied to the drive shaft 36 is the sum of the torque applied to the drive shaft 36 through regenerative driving of the motor MG2 and the torque applied to the drive shaft 36 through the motoring of the engine 22 by the motor MG1. However, since the latter torque is basically sufficiently smaller than (e.g., is equal to about 1/10 to 1/20 of) the former torque, the required torque Tr* is set as the torque command Tm2* in some embodiments. Incidentally, if the required charging/discharging power Pbtag is equal to or smaller than the required power Pr* in step S 140, the required power Pr* and the target charging/discharging power Pb* are equal to each other. Therefore, the target motoring power Pmt* is equal to the value 0 in step S150, and the target rotational speed Ne* of the engine 22 is equal to the value 0 in step S160. In this case, the motoring of the engine 22 is not carried out by the motor MG1. Thus, the motor MG1 can be restrained from wastefully consuming power.

Then, by setting the required charging/discharging power Pbtag and the target charging/discharging power Pb* without taking the required torque Tr* (the required power Pr*) into account, the target motoring power Pmt* is made larger and the target rotational speed Ne* of the engine 22 is made higher when the required torque Tr* (the required power Pr*) is small (large as a value on the braking side) than when the required torque Tr* (the required power Pr*) is large, from the start of the charge of the battery 50 to the start of rapid increase (rapid decrease as a value on the charge side) in the charging/discharging power Pb of the battery 50. In this manner, when the required torque Tr* is relatively small, the power consumed by the motor MG1 is made large until the start of rapid increase in the charging/discharging power Pb of the battery 50. Thus, the charging/discharging power Pb of the battery 50 is restrained from becoming small (large as a value on the charge side). As described above, the input limit Win is set such that the time from the start of the charge of the battery 50 to the start of rapid increase (rapid decrease as a value on the charge side) in the charging/discharging power Pb becomes shorter and the amount of increase (the amount of decrease as a value on the charge side) per unit time at the time of the start of rapid increase in the charging/discharging power Pb becomes larger when the charging/discharging power Pb is small (large as a value on the charge side) than when the charging/discharging power Pb is large. Accordingly, the following effects are achieved by restraining the charging/discharging power Pb of the battery 50 from becoming small (large as a value on the charge side) until the start of rapid increase in the charging/discharging power Pb of the battery 50. First of all, the time to the start of rapid increase (rapid decrease as a value on the charge side) in the charging/discharging power Pb of the battery 50 can be restrained from becoming short, and the time to the start of rapid rise in the rotational speed Ne of the engine 22 can be restrained from becoming short. Besides, the amount of increase (the amount of decrease as a value on the charge side) per unit at the time of the start of rapid increase in the charging/discharging power Pb of the battery 50 can also be restrained from becoming large, and the amount of rise per unit time at the time of the start of rapid rise in the rotational speed Ne of the engine 22 can also be restrained from becoming large. As a result, the driver can be restrained from developing a feeling of strangeness when a braking request continues during the performance of cruise control or variable speed limiter control.

Next, the reason why the required charging/discharging power Pbtag is so set as to become larger (smaller as a value on the charge side) when the battery temperature Tb is low than when the battery temperature Tb is high will be described. As described above, the input limit Win is set such that the time from the start of the charge of the battery 50 to the start of rapid increase (rapid decrease as a value on the charge side) in the charging/discharging power Pb becomes shorter when the battery temperature Tb is low than when the battery temperature Tb is high. Accordingly, as shown in FIG. 5, by setting the required charging/discharging power Pbtag such that the required charging/discharging power Pbtag becomes larger when the battery temperature Tb is low than when the battery temperature Tb is high, the time to the start of rapid increase (rapid decrease as a value on the charge side) in the charging/discharging power Pb of the battery 50 can be restrained from becoming short, and the time to the start of rapid rise in the rotational speed Ne of the engine 22 can be restrained from becoming short. As a result, the driver can be more appropriately restrained from developing a feeling of strangeness in accordance with the battery temperature Tb, when a braking request continues during the performance of cruise control or variable speed limiter control.

Figure 7:
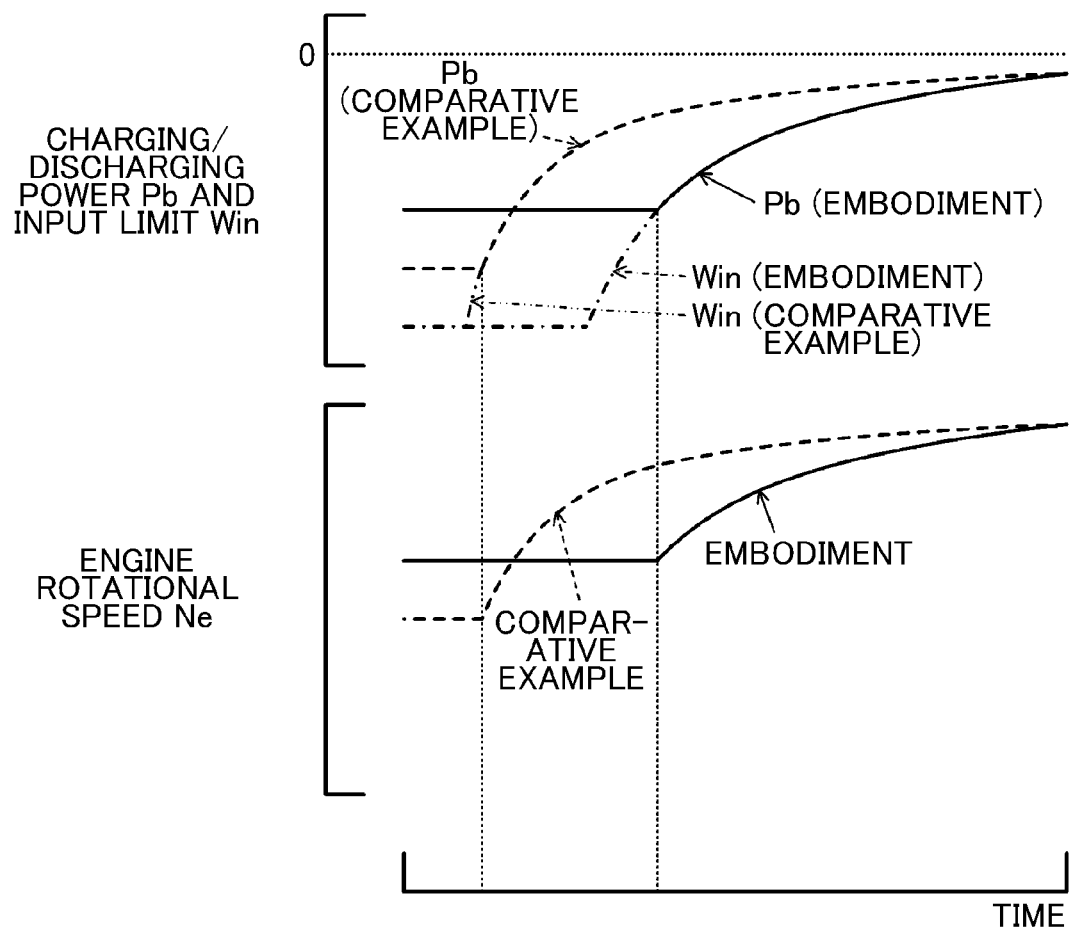
FIG. 7 is an illustrative view showing an example of how the charging/discharging power Pb of the battery 50, the input limit Win and a rotational speed Ne of an engine 22 change with time when a braking request is made during the performance of cruise control or variable speed limiter control.

FIG. 7 is an illustrative view showing an example of how the charging/discharging power Pb of the battery 50, the input limit Win of the battery 50 and the rotational speed Ne of the engine 22 change with time when a braking request is made during the performance of cruise control or variable speed limiter control. In the drawing, solid lines indicate the case of the embodiments described herein, and broken lines indicate the case of a comparative example. In some embodiments, the target rotational speed Ne* (the rotational speed Ne) of the engine 22 at the time of the start of braking is made higher when the required torque Tr* (the required power Pr*) is small (large as a value on the braking side) than when the required torque Tr* (the required power Pr*) is large. Besides, as the comparative example, a case where the target rotational speed Ne* (the rotational speed Ne) of the engine 22 at the time of the start of braking is made equal to a uniform value regardless of the required torque Tr* is considered. In some embodiments, by making the rotational speed Ne of the engine 22 higher when the required torque Tr* (the required power Pr*) is small (large as a value on the braking side) than when the required torque Tr* (the required power Pr*) is large from the start of the charge of the battery 50 to the start of rapid increase (rapid decrease as a value on the charge side) in the charging/discharging power Pb of the battery 50, the charging/discharging power Pb of the battery 50 is restrained from becoming smaller (larger as a value on the charge side) than in the comparative example, as shown in the drawing. Accordingly, the time to the start of rapid increase (rapid decrease as a value on the charge side) in the charging/discharging power Pb of the battery 50 can be restrained from becoming short, and the time to the start of rapid rise in the rotational speed Ne of the engine 22 can be restrained from becoming short. Besides, the amount of increase (the amount of decrease as a value on the charge side) per unit time at the time of the start of rapid increase in the charging/discharging power Pb of the battery 50 can also be restrained from becoming large, and the amount of rise per unit time at the time of the start of rapid rise in the rotational speed Ne of the engine 22 can also be restrained from becoming large. As a result, the driver can be restrained from developing a feeling of strangeness when a braking request continues during the performance of cruise control or variable speed limiter control.

With the hybrid vehicle 20 described above, the target rotational speed Ne* (the rotational speed Ne) of the engine 22 is made higher when the required torque Tr* (the required power Pr*) is small (large as a value on the braking side) than when the required torque Tr* (the required power Pr*) is large, from the start of the charge of the battery 50 to the start of rapid increase (rapid decrease as a value on the charge side) in the charging/discharging power Pb of the battery 50, in the case where a braking force is applied to the vehicle while the battery 50 is charged within the range of the input limit Win of the battery 50 through regenerative driving of the motor MG2 and the motoring of the engine 22 by the motor MG1 with fuel injection stopped, in response to the making of a braking request during the performance of cruise control or variable speed limiter control. Accordingly, the time to the start of rapid increase (rapid decrease as a value on the charge side) in the charging/discharging power Pb of the battery 50 can be restrained from becoming short, and the time to the start of rapid increase in the rotational speed Ne of the engine 22 can be restrained from becoming short. Besides, the amount of increase (the amount of decrease as a value on the charge side) per unit time at the time of the start of rapid increase in the charging/discharging power Pb of the battery 50 can also be restrained from becoming large, and the amount of rise per unit time at the time of the start of rapid rise in the rotational speed Ne of the engine 22 can also be restrained from becoming large. As a result, the driver can be restrained from developing a feeling of strangeness when a braking request continues during the performance of cruise control or variable speed limiter control.

In some embodiments, the required charging/discharging power Pbtag is so set as to become larger (smaller as a value on the charge side) when the battery temperature Tb is low than when the battery temperature Tb is high, in the case where a braking request is made during the performance of cruise control or variable speed limiter control. However, a uniform value may be used regardless of the battery temperature Tb.

In some embodiments, the required charging/discharging power Pbtag is so set as to become larger (smaller as a value on the charge side) when the battery temperature Tb is low than when the battery temperature Tb is high, in the case where a braking request is made during the performance of cruise control or variable speed limiter control. However, when a braking request is made during the performance of cruise control, the required charging/discharging power Pbtag may be set in accordance with the vehicle speed V instead of or in addition to the battery temperature Tb. In this case, the required charging/discharging power Pbtag may be so set as to become larger (smaller as a value on the charge side) when the vehicle speed V is high than when the vehicle speed V is low. In this manner, the target rotational speed Ne* (the rotational speed Ne) of the engine 22 is made higher when the vehicle speed V is high than when the vehicle speed V is low. That is, the target rotational speed Ne* (the rotational speed Ne) of the engine 22 falls as the vehicle speed V falls. Therefore, the driver can be made to feel a feeling of deceleration in decelerating as the preceding vehicle decelerates during the performance of vehicle-to-vehicle control as cruise control.

Figure 8:
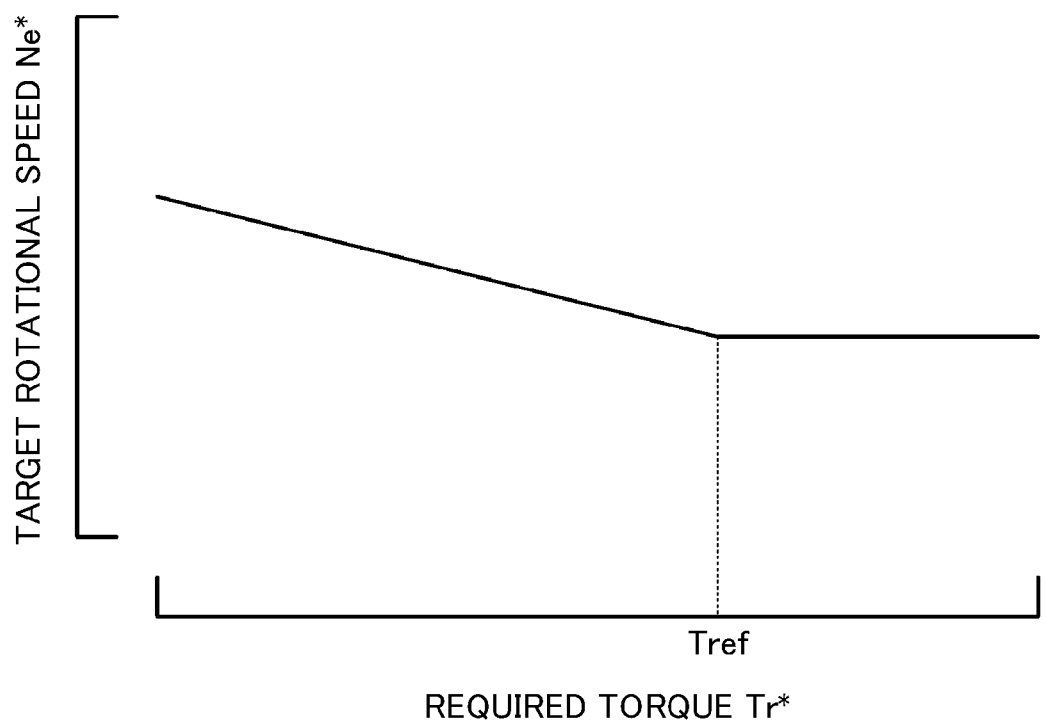
FIG. 8 is an illustrative view showing an exemplary target rotational speed setting map.

In some embodiments, the target rotational speed Ne* of the engine 22 is made higher when the required torque Tr* (the required power Pr*) is small (large as a value on the braking side) than when the required torque Tr* (the required power Pr*) is large, from the start of the charge of the battery 50 to the start of rapid increase (rapid decrease as a value on the charge side) in the charging/discharging power Pb of the battery 50, by setting the required charging/discharging power Pbtag without taking the required torque Tr* into account in the case where a braking request is made during the performance of cruise control or variable speed limiter control. However, the target rotational speed Ne* of the engine 22 may be directly set in such a manner as to become higher when the required torque Tr* (the required power Pr*) is small (large as a value on the braking side) than when the required torque Tr* (the required power Pr*) is large and such that the charging/discharging power Pb falls within the range of the input limit Win, without setting the required charging/discharging power Pbtag, from the start of the charge of the battery 50 to the start of rapid increase (rapid decrease as a value on the charge side) in the charging/discharging power Pb of the battery 50, in the case where a braking request is made during the performance of cruise control or variable speed limiter control. In this case, the target rotational speed Ne* of the engine 22 from the start of the charge of the battery 50 to the start of rapid increase (rapid decrease as a value on the charge side) in the charging/discharging power Pb of the battery 50 can be set by, for example, determining a relationship between the required torque Tr* and the target rotational speed Ne* of the engine 22 in advance, storing the determined relationship into the ROM (not shown) as a target rotational speed setting map according to a modification example, and deriving the corresponding target rotational speed Ne* from this map when the required torque Tr* is given. FIG. 8 shows an example of the target rotational speed setting map according to the modification example. As shown in the drawing, the value 0 can be set as the target rotational speed Ne* of the engine 22 when the required torque Tr* is equal to or larger than a negative threshold Tref (equal to or smaller than the threshold Tref as a value on the braking side). The target rotational speed Ne* of the engine 22 can be so set as to become higher when the required torque Tr* is small (large as a value on the braking side) than when the required torque Tr* is large, in concrete terms, to rise as the required torque Tr* decreases, in the case where the required torque Tr* is smaller than the threshold Tref. The motoring of the engine 22 is not carried out by the motor MG1 when the target rotational speed Ne* of the engine 22 is equal to the value 0. The motoring of the engine 22 is carried out at the target rotational speed Ne* by the motor MG1 when the target rotational speed Ne* of the engine 22 is larger than the value 0. A uniform value may be used as the threshold Tref, or the threshold Tref may be appropriately set based on the battery temperature Tb or the like. The target rotational speed Ne* of the engine 22 at and after the start of rapid increase (rapid decrease as a value on the charge side) in the charging/discharging power Pb of the battery 50 can be set such that the charging/discharging power Pb of the battery 50 falls within the range of the input limit Win, in concrete terms, in such a manner as to rise as the input limit Win rapidly increases (rapidly decreases as a value on the charge side).

In some embodiments, if the required power Pr* is equal to or larger than the required charging/discharging power Pbtag (equal to or smaller than the required charging/discharging power Pbtag as a value on the braking side) when a braking request is made during the performance of cruise control or variable speed limiter control, the required power Pr* and the target charging/discharging power Pb* are equal to each other, the target motoring power Pmt* and the target rotational speed Ne* of the engine 22 are equal to the value 0, and the motoring of the engine 22 is not carried out by the motor MG1. However, when a braking request is made during the performance of cruise control or variable speed limiter control, the motoring of the engine 22 may be carried out by the motor MG1 at a rotational speed that is higher when the required torque Tr* is small (large as a value on the braking side) than when the required torque Tr* is large, even in the case where the required power Pr* is equal to or larger than the required charging/discharging power Pbtag.

In some embodiments, the battery 50 is configured as a lithium-ion secondary battery. However, the battery 50 may be configured as a nickel hydride secondary battery or the like.

In some embodiments, the engine 22 is an exemplification of "the engine", the motor MG1 is an exemplification of "the first motor", the planetary gear 30 is an exemplification of "the planetary gear", the motor MG2 is an exemplification of "the second motor", the battery 50 is an exemplification of "the battery", the battery ECU 52 is an exemplification of "the setting unit", and the HVECU 70, the engine ECU 24 and the motor ECU 40 are an exemplification of "the control unit".

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The disclosed embodiments can be utilized in an industry for manufacturing hybrid vehicles, and the like.

What is claimed is:

1. A hybrid vehicle comprising:
an engine;
a first motor;
a planetary gear having three rotary elements that are connected to a rotary shaft of the first motor, an output shaft of the engine and a drive shaft coupled to an axle respectively in such a manner as to be arranged in a sequence of the rotary shaft, the output shaft and the drive shaft in an alignment chart;
a second motor that is connected to the drive shaft;
a battery that exchanges power with the first motor and the second motor;
a setting unit that sets a permissible charging power of the battery and a permissible discharging power of the battery; and
a control unit that controls the engine, the first motor and the second motor such that the vehicle runs while the battery is charged/discharged within a range of the permissible charging power and a range of the permissible discharging power respectively, wherein
the setting unit is configured to set the permissible charging power such that:
(i) a time from a start of a charge of the battery to a start of a rapid decrease in a charging power of the battery is shorter when the charging power is a larger charging power than when the charging power is a smaller charging power that is smaller than the larger charging power, in a case where the charge is continued, wherein the rapid decrease in the charging power is a decrease in the charging power per unit time larger than a predetermined decrease in the charging power per unit time; and
(ii) an amount of decrease in the charging power per unit time at the time of the start of the rapid decrease in the charging power is larger when the charging power is the larger charging power than when the charging power is the smaller charging power, in the case where the charge is continued, and
the control unit is configured to perform control such that motoring of the engine is carried out at a higher rotational speed when a required braking force is a larger required braking force than when the required braking force is a smaller required braking force that is smaller than the larger required braking force, from the start of the charge to the start of the rapid decrease in the charging power, in a case where predetermined control is performed to control the first motor and the second motor such that the battery is charged within the range of the permissible charging power through regenerative driving of the second motor and motoring of the engine by the first motor with fuel injection stopped and that the required braking force at a braking request is applied to the vehicle, in response to making of the braking request during performance of cruise control or variable speed limiter control.

2. The hybrid vehicle according to claim 1, wherein
the control unit is configured not to carry out motoring of the engine by the first motor when a target rotational speed of the engine is equal to zero, in performing the predetermined control.

3. The hybrid vehicle according to claim 1, wherein
the setting unit is configured to set the permissible charging power such that the time from the start of the charge to the start of the rapid decrease in the charging power is shorter when a temperature of the battery is a lower temperature than when the temperature of the battery is a higher temperature that is higher than the lower temperature, in the case where the charge is continued, and
the control unit is configured to perform control such that motoring of the engine is carried out at a rotational speed that is: (i) higher when the required braking force is the larger required braking force than when the required braking force is the smaller required braking force; and (ii) higher when the temperature of the battery is the lower temperature than when the temperature of the battery is the higher temperature, until the start of the rapid decrease in the charging power, in performing the predetermined control in response to making of the braking request during performance of the cruise control or the variable speed limiter control.

4. The hybrid vehicle according to claim 3, wherein
the control unit is configured to set a required charging power of the battery such that the required charging power is smaller when the temperature of the battery is the lower temperature than when the temperature of the battery is the higher temperature, until the start of the rapid decrease in the charging power, in performing the predetermined control in response to making of the braking request during performance of the cruise control or the variable speed limiter control,
the control unit is configured to limit the required charging power by the permissible charging power and set a target charging power of the battery,
the control unit is configured to set a target rotational speed of the engine such that the target rotational speed is: (i) higher when the required braking force is the larger required braking force than when the required braking force is the smaller required braking force; and (ii) higher when the target charging power is a smaller target charging power than when the target charging power is a larger target charging power that is larger than the smaller target charging power, and
the control unit is configured to perform control such that motoring of the engine is carried out at the target rotational speed.

5. The hybrid vehicle according to claim 2, wherein
the setting unit is configured to set the permissible charging power such that the time from the start of the charge to the start of the rapid decrease in the charging power is shorter when a temperature of the battery is a lower temperature than when the temperature of the battery is a higher temperature that is higher than the lower temperature, in the case where the charge is continued, and
the control unit is configured to perform control such that motoring of the engine is carried out at a rotational speed that is: (i) higher when the required braking force is the larger required braking force than when the required braking force is the smaller required braking force; and (ii) higher when the temperature of the battery is the lower temperature than when the temperature of the battery is the higher temperature, until the start of the rapid decrease in the charging power, in performing the predetermined control in response to making of the braking request during performance of the cruise control or the variable speed limiter control.

6. The hybrid vehicle according to claim 5, wherein
the control unit is configured to set a required charging power of the battery such that the required charging power is smaller when the temperature of the battery is the lower temperature than when the temperature of the battery is the higher temperature, until the start of the rapid decrease in the charging power, in performing the predetermined control in response to making of the braking request during performance of the cruise control or the variable speed limiter control,
the control unit is configured to limit the required charging power by the permissible charging power and set a target charging power of the battery,
the control unit is configured to set a target rotational speed of the engine such that the target rotational speed is: (i) higher when the required braking force is the larger required braking force than when the required braking force is the smaller required braking force; and (ii) higher when the target charging power is a smaller target charging power than when the target charging power is a larger target charging power that is larger than the smaller target charging power, and
the control unit is configured to perform control such that motoring of the engine is carried out at the target rotational speed.

* * * * *